US008463765B2

(12) United States Patent
Lesavich

(10) Patent No.: US 8,463,765 B2
(45) Date of Patent: Jun. 11, 2013

(54) METHOD AND SYSTEM FOR CREATING VERTICAL SEARCH ENGINES WITH CLOUD COMPUTING NETWORKS

(76) Inventor: Zachary C. Lesavich, Chicago, IL (US)

( * ) Notice: Subject to any disclaimer, the term of this patent is extended or adjusted under 35 U.S.C. 154(b) by 60 days.

(21) Appl. No.: 13/097,227

(22) Filed: Apr. 29, 2011

(65) Prior Publication Data
US 2011/0208710 A1    Aug. 25, 2011

(51) Int. Cl.
G06F 7/00    (2006.01)
G06F 17/30    (2006.01)

(52) U.S. Cl.
USPC .......................................... 707/706

(58) Field of Classification Search
USPC .................................. 707/707, 706
See application file for complete search history.

(56) References Cited

U.S. PATENT DOCUMENTS

| | | |
|---|---|---|
| 5,499,366 A | 3/1996 | Rosenberg |
| 5,577,241 A | 11/1996 | Spencer |
| 5,878,423 A | 3/1999 | Anderson |
| 5,915,249 A | 6/1999 | Spencer |
| 5,956,711 A | 9/1999 | Sullivan et al. |
| 5,966,533 A | 10/1999 | Moody |
| 5,983,214 A | 11/1999 | Lang |
| 5,983,227 A | 11/1999 | Nazem |
| 5,991,756 A | 11/1999 | Wu |
| 6,012,053 A | 1/2000 | Pant |
| 6,029,161 A | 2/2000 | Lang |
| 6,073,241 A | 6/2000 | Rosenberg |
| 6,112,203 A | 8/2000 | Bharat |
| 6,128,623 A | 10/2000 | Mattis |
| 6,128,627 A | 10/2000 | Mattis |
| 6,138,113 A | 10/2000 | Dean |
| 6,205,469 B1 | 3/2001 | Graham |
| 6,209,003 B1 | 3/2001 | Mattis |
| 6,216,157 B1 | 4/2001 | Vishwanath |
| 6,219,671 B1 | 4/2001 | DeVries |
| 6,230,155 B1 | 5/2001 | Broder |
| 6,230,158 B1 | 5/2001 | Burrows |
| 6,266,657 B1 | 7/2001 | DeVries |
| 6,275,827 B1 | 8/2001 | DeVries |
| 6,289,358 B1 | 9/2001 | Mattis |
| 6,292,880 B1 | 9/2001 | Mattis |
| 6,308,175 B1 | 10/2001 | Lang |
| 6,308,214 B1 | 10/2001 | Plevyak |
| 6,311,189 B1 | 10/2001 | DeVries |
| 6,314,420 B1 | 11/2001 | Lang |
| 6,317,741 B1 | 11/2001 | Burrows |
| 6,321,220 B1 | 11/2001 | Dean |
| 6,321,265 B1 | 11/2001 | Najork |
| 6,332,144 B1 | 12/2001 | DeVries |
| 6,343,302 B1 | 1/2002 | Graham |

(Continued)

Primary Examiner — Jacob F Bétit
Assistant Examiner — Griselle Corbo
(74) Attorney, Agent, or Firm — Lesavich High-Tech Law Group, P.C.

(57) ABSTRACT

A method and system for creating vertical search engines with cloud computing networks. The cloud computing networks include a cloud communications network using public networks, private networks, community networks and hybrid networks. The cloud communications network provides on-demand vertical search services, broadband network access, resource pooling, rapid elasticity and measured electronic services for vertical search engines. The method and system dramatically improve a vertical search engine infrastructure used by searchers by providing vertical electronic information using less bandwidth and less processing cycles via the cloud communications network than via a non-cloud communications network. Custom vertical search engines can be created by a user with QR bar codes and other types of bar codes and other types of custom information.

20 Claims, 11 Drawing Sheets

U.S. PATENT DOCUMENTS

| | | |
|---|---|---|
| 6,349,296 B1 | 2/2002 | Broder |
| 6,359,633 B1 | 3/2002 | Balasubramaniam |
| 6,360,215 B1 | 3/2002 | Judd |
| 6,381,594 B1 | 4/2002 | Eichstaedt |
| 6,442,606 B1 | 8/2002 | Subbaroyan |
| 6,463,430 B1 | 10/2002 | Brady et al. |
| 6,490,575 B1 | 12/2002 | Berstis |
| 6,714,934 B1 | 3/2004 | Fordham |
| 7,680,860 B1 | 3/2010 | Fordham |
| 8,363,806 B2 | 1/2013 | Bookstaff |
| 2001/0016846 A1 * | 8/2001 | Chakrabarti et al. ......... 707/102 |
| 2005/0011957 A1 | 1/2005 | Attia et al. |
| 2005/0082370 A1 | 4/2005 | Frantz et al. |
| 2006/0075026 A1 | 4/2006 | Ryu et al. |
| 2006/0082475 A1 | 4/2006 | Zhao et al. |
| 2007/0063050 A1 | 3/2007 | Attia et al. |
| 2009/0151210 A1 | 6/2009 | Nagatome |
| 2010/0094878 A1 * | 4/2010 | Soroca et al. ................. 707/748 |
| 2011/0251942 A1 * | 10/2011 | Rosenthal et al. .............. 705/37 |
| 2012/0084665 A1 | 4/2012 | Bookstaff |
| 2012/0185307 A1 | 7/2012 | Bookstaff |
| 2012/0278622 A1 | 11/2012 | Lesavich et al. |
| 2012/0303511 A1 | 11/2012 | Sandor et al. |

\* cited by examiner

96 — CREATING A VERTICAL SEARCH ENGINE APPLICATION ON THE CLOUD COMPUTING APPLICATION ON THE SERVER NETWORK DEVICE WITH THE RECEIVED ELECTRONIC INFORMATION, THE VERTICAL SEARCH ENGINE APPLICATION INCLUDING A PLURALITY OF VERTICAL TAXONOMIES AND A PLURALITY OF VERTICAL ONTOLOGIES ARRANGED IN A VERTICAL HIERARCHICAL STRUCTURE, WHEREIN THE RECEIVED ELECTRONIC INFORMATION IS LOCATED ANYWHERE ON THE PUBLIC COMMUNICATION NETWORK, THE ONE OR MORE PRIVATE NETWORKS, COMMUNITY NETWORKS OR HYBRID NETWORKS ON THE CLOUD COMMUNICATIONS NETWORK

↓

98 — MAKE THE VERTICAL SEARCH ENGINE APPLICATION AVAILABLE TO OTHER NETWORK DEVICES FROM SERVER NETWORK DEVICE ON THE CLOUD COMMUNICATIONS NETWORK, THEREBY ALLOWING A PLURALITY OF OTHER TARGET NETWORK DEVICES OR OTHER SERVER NETWORK DEVICES TO SELECTIVELY REQUEST ONE OR MORE INDIVIDUAL PIECES OF ELECTRONIC INFORMATION VIA THE VERTICAL SEARCH ENGINE APPLICATION ON THE SERVER NETWORK DEVICE IN REAL-TIME USING LESS BANDWIDTH AND LESS PROCESSING CYCLES VIA THE CLOUD COMMUNICATIONS NETWORK THAN VIA A NON-CLOUD COMMUNICATIONS NETWORK

↓

( END )

METHOD AND SYSTEM FOR CREATING VERTICAL SEARCH ENGINES WITH CLOUD COMPUTING NETWORKS

FIELD OF THE INVENTION

This invention relates to providing electronic search information over a computer network. More specifically, it relates to a method and system for creating vertical search engines with cloud computing networks.

BACKGROUND OF THE INVENTION

The Internet is a world-wide interconnected network of devices including computers, servers, gateways, routers and other devices. The World-Wide-Web (WWW) is collection of servers and other devices on the Internet that support electronic document exchange. Electronic documents on the WWW are formatted in special languages called mark-up languages (e.g., Hyper Text Mark-Up Language (HTML), Extensible Markup Language (XML), etc.) that support electronic links or "hyperlinks" to other documents, as well as to graphics, audio, video, animation and other types of electronic content.

To find electronic information on the WWW, search engines are used. A "search engine" is a software program that searches documents for specified keywords and returns a list of hyperlinks to the documents where the keywords were found. Although a search engine is really a general class of programs, the term is often used to specifically describe systems like Yahoo, Google, Bing and others that enable users to search for electronic content on the WWW.

Typically, a search engine works by sending out a software "spider" to fetch as many electronic documents as possible. Another program, called an "indexer," then reads these documents and creates an index of Uniform Resource Locators (URL) based on the keywords contained in each document. Each search engine typically uses a distinct proprietary algorithm to create its indices such that meaningful results are returned for each query.

A "spider" is an automated program that searches the Internet for new WWW documents. An "indexer" indexes the corresponding URLs and content-related information in a database, which can be examined for matches by a search engine. Spiders are generally considered to be a type of "bot," or Internet robot and are also called "crawlers."

However, there are a number of problems associated with general search engines. One problem is that a general search engine is designed to provide all types of general information to all types of users. A general search engine's search algorithms are typically designed to "horizontally" search for a "breath" of information to provide general types of information. This horizontal search approach causes individuals looking for specific information on the WWW to look through hundreds, if not thousands, of irrelevant pieces of information to finally locate the information they seek, provided they find it at all.

Another problem is that general search engines often return indexes including a large number of links to information that is not closely related to a search requested by a user. This makes it difficult for a user to locate desired information and often leads to user confusion and user dissatisfaction.

Another problem is that vague search terms used in a general search engine return a large a huge number of results. However, a vague search term may be a term of art or all the user knows. The vague search term may not be vague at all when applied to a specific topic or a specific topic.

There have been some attempts to solve some of the problems with general search engines with specialized search engines, such as vertical search engines. Vertical search engines are designed to "vertically" search for a "depth" of information instead of "horizontally" search for a "breath" of information. There has also been some attempts to use cloud computing networks with search engines.

For example, U.S. Pat. No. 7,917,584, that issued to Arthursson teaches "Generally described, the present invention is directed to a network operating system that provides more effective ways of leveraging the connectivity of computer networks. In one embodiment, an XML virtual machine is implemented that accepts high-level application code written in an XML programming language as input. Functionality is provided to interpret or translate the application code written in an XML programming language into code that is suitable for execution across computer platforms. Moreover, the XML virtual machine supports the Model View Controller (MVC) design paradigm that facilitates true data abstraction from applications to a common data model. Multi-instance applications, with each instance potentially supporting multiple views, may be created and executed."

U.S. Pat. No. 7,908,151 that issued to Heckerman et al teaches "The claimed subject matter provides a system and/or a method that facilitates dynamically providing a question to ask a medical professional during an appointment. An interface can receive a portion of medical data. A counselor component can generate a question based on the portion of medical data, wherein the question is generated to elicit an answer from a medical professional during an appointment. Moreover, the counselor component can dynamically generate a second question directed toward the medical professional based upon at least one of the answer or a value of information (VOI) computation."

U.S. Pat. No. 7,890,549 that issued to Elad et al teaches "The present invention, known as The Collaboration Portal (COPO), relates generally to the field of automated entity, data processing, system control, and data communications, and more specifically to an integrated method, system, and apparatus for providing computer-accessible benefits for communities of users. It provides a framework for provisioning computer-accessible benefits for communities of users, and can efficiently and robustly distribute the processing in behalf of those users over a decentralized network of computers. The field of the invention generally encompasses enabling appropriate and desired communication among communities of users and organizations, and providing information, goods, services, a works, opportunities, and connections among users and organizations."

U.S. Pat. No. 7,885,913 that issued to Weber et al teaches "System and method related to a distributed collaborative knowledge generation system are disclosed. The distributed collaborative knowledge generation system includes one or more databases configured to store content information related to the distributed collaborative knowledge generation system, a search services module configured to search for the content information, a web services module configured to retrieve and gather the content information, a presentation services module configured to share the content data with multiple users, and a data services module configured to manage the content information by providing interfaces between the one or more databases, the search services module, the web services module, and the presentation services module."

U.S. Pat. No. 7,873,349 that issued to Smith et al teaches "A mobile communication device that may be used by an investigator to secretly record a suspect and track the investigator's location includes a microphone for detecting sounds, a communication component for transmitting signals or data representative of the sounds to one of the portable computers via the wireless communication network, a display for displaying information related to operation of the device, a computing device, and a computer program implemented by the computing device. The computer program is operable to place the device in a stealth mode in which the display is turned off or otherwise deactivated to make the entire device appear to be turned off while the microphone continues to detect sounds and the communication component continues to transmit signals or data representative of the sounds to a surveillance or support team operating one of the portable computers. The mobile communication device may also include a location-determining component for determining geographic locations of the device and for transmitting location data to the portable computer."

U.S. Pat. No. 7,853,458 that issued to Hoffman et al teaches "A system is provided that integrates of records of clinical laboratory services into the assessment and optimization of patient health care and, in particular, regulation of the use of pharmaceuticals. Laboratory test result records are used in conjunction with other health care benefits records to monitor regulation of use of pharmaceuticals by patients. The incorporation of laboratory tests and results into such a utilization system allows improvement in the management of a patient's therapy based on a more precise picture of the patient's level of illness as revealed by the laboratory test results. The system of the present invention also allows optimization of the selection of laboratory tests to be performed, and also provides an outcome assessment of the risk of hospitalization due to pharmaceutical treatments resulting in physician intervention, leading to a change in physician prescribing behavior and, accordingly, a decrease in drug induced hospitalizations and improved quality of patient care and savings of health care costs."

U.S. Pat. No. 7,716,209 that issued to Rappaport et al teaches "A method of searching for information includes receiving a query, providing the query to a first search engine that searches a set of data sources, the data sources having relationships to an ontology, receiving search results from the search engine, analyzing the search results to determine at least one statistic corresponding to the search results and the query, wherein the statistic is based upon a relevance score that is calculated based upon a first weighting function related to a concept, a second weighting function related to a data source item, a set of items related to the concept, and a set of items related to the search results, and providing at least one concept to a user, wherein said at least one concept correspond to said at least one statistic."

U.S. Pat. No. 7,714,934 that issued to Ejima et al teaches "Digital audio data which have a predetermined packet structure are divided into units including a predetermined number of bits; each unit of the divided digital audio data is converted into specific data to be encoded; the encoded data are arranged in blanking intervals of video data; the digital audio data are transmitted as well as the video data using a transmission line for the video data, and the video data and the audio data may be simultaneously and favorably transmitted, adopting an existing video-data transmission format such as the DVI standard."

U.S. Pat. No. 7,680,860 that issued to Fordham teaches "A method and system for creating a vertical search engine. The method and system may help allow "vortals" to be created for the Internet and other computer networks that efficiently index and search lists of Uniform Resource Locators ("URLs") created from an appropriate list of keywords for a selected topic. Vortals include information pertinent to a targeted topic of a very small horizontal breath, but a larger depth. The created vortals may provide greater user satisfaction and less user frustration when searching for information about a selected topic."

U.S. Pat. No. 7,593,935 that issued to Sullivan teaches "Systems and methods for ranking pages and/or hosts in a faster and more relevant manner are provided. Systems and methods for ranking pages and/or hosts based on session data and/or traffic data are also provided. According to the invention, session maps can be created using DNS and/or ISP data. Systems and methods for ranking pages and/or hosts for the purpose of doing business are also provided."

U.S. Pat. No. 6,714,934 that issued to Fordham teaches "A vortal is a specific type of search engine that provides information and resources related only to one (or a small number) specific topic. These sites typically contain focused information, such as "vertical" or "in-depth" information pertinent only to their particular targeted topic of interest. Vortals include information pertinent to a targeted topic of a very small horizontal breath, but a larger depth. A method and system for creating a vertical search engine is presented. The method and system may help allow vortals to be created for the Internet and other computer networks that efficiently index and search lists of Uniform Resource Locators ("URLs") created from an appropriate list of keywords for a selected topic. The created vortals may provide greater user satisfaction and less user frustration when searching for information about a selected topic."

However, none of these solutions solve all the problems with general and/or specialized search engines. Thus, it is desirable to solve some of the problems associated with generals search engines.

SUMMARY OF THE INVENTION

In accordance with preferred embodiments of the present invention, some of the problems with supplying multiple types of electronic information are overcome. A method and system for creating vertical search engines with cloud computing networks is presented.

The cloud communications network provides on-demand vertical search services, broadband network access, resource pooling, rapid elasticity and measured electronic services for vertical search engines. The method and system dramatically improve a vertical search engine infrastructure used by searchers by providing vertical electronic information using less bandwidth and less processing cycles via the cloud communications network than via a non-cloud communications network. Custom vertical search engines can be created by a user with QR bar codes and other types of bar codes and other types of custom information.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Figure 1:
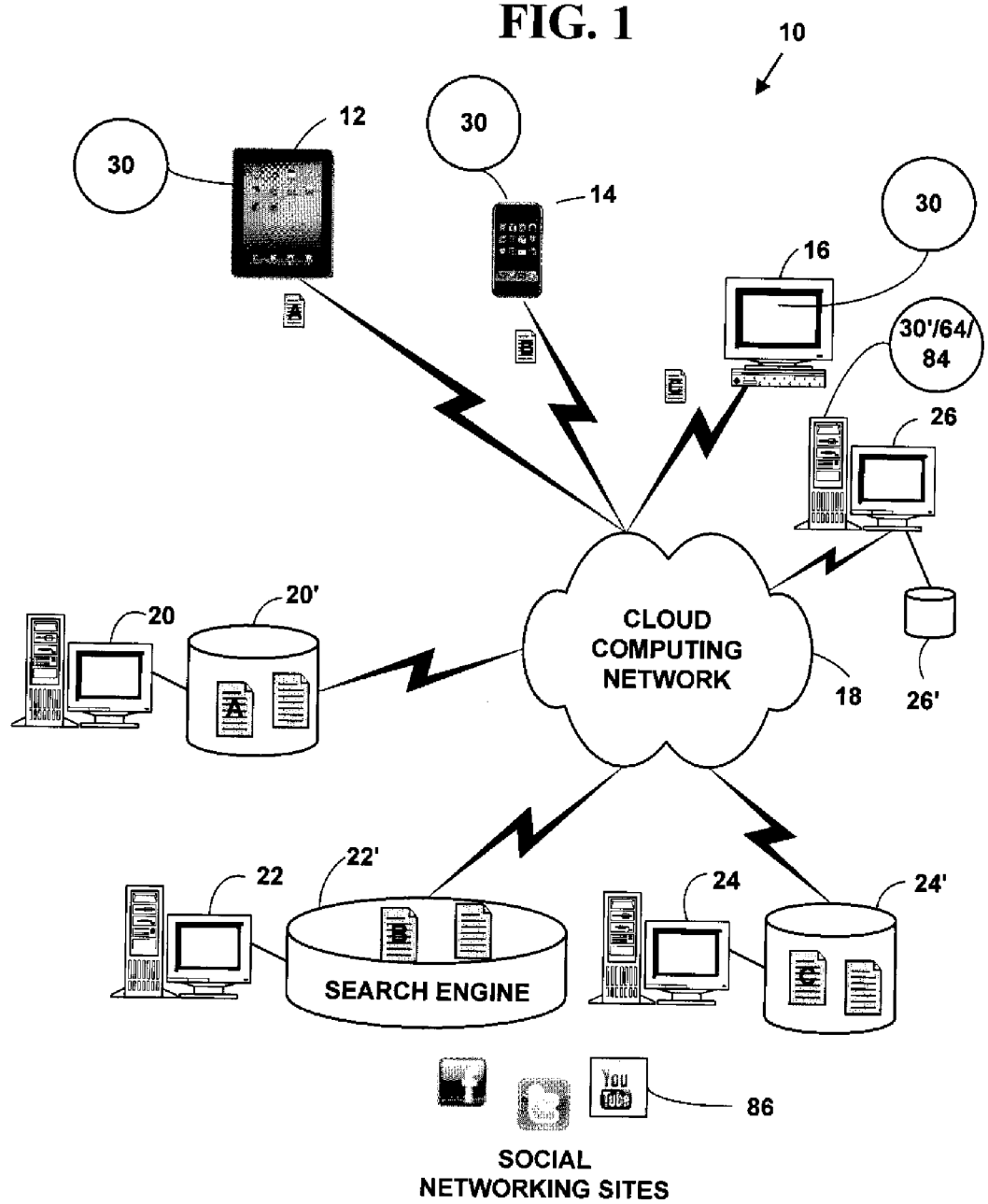
FIG. 1 is a block diagram illustrating an exemplary electronic information display system.

FIG. 1 is a block diagram illustrating an exemplary electronic information system 10. The exemplary electronic system 10 includes, but is not limited to, one or more target network devices 12, 14, 16 (only three of which are illustrated) each with one or more processors and a computer readable medium.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV) set-top boxes, digital televisions including high definition television (HDTV), three-dimensional (3D) televisions and other types of network devices.

The one or more smart network devices 12, 14, 16 also include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Andriod is an open source operating system platform backed by Google, along with major hardware and software developers (such as Intel, HTC, ARM, Motorola and Samsung, etc.), that form the Open Handset Alliance.

The one or more smart network devices 12, 14, 16 also include tablet computers such as the iPad, by Apple, Inc., the HP Tablet, by Hewlett Packard, Inc., the Playbook, by RIM, Inc., the Tablet, by Sony, Inc.

The target network devices 12, 14, 16 are in communications with a cloud communications network 18 via one or more wired and/or wireless communications interfaces. The cloud communications network 18 includes, but is not limited to, communications over a wire connected to the target network devices, wireless communications, and other types of communications using one or more communications and/or networking protocols. In one embodiment, the cloud communications network 18 also includes a cloud communications network 19.

Plural server network devices 20, 22, 24, 26 (only four of which are illustrated) each with one or more processors and a computer readable medium include one or more associated databases 20', 22', 24', 26'. The plural network devices 20, 22, 24, 26 are in communications with the one or more target devices 12, 14, 16 via the cloud communications network 18.

The plural server network devices 20, 22, 24 26, include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 includes, but is not limited to, a wired and/or wireless communications network comprising: the Internet, an intranet, a Local Area Network (LAN), a LAN (WiLAN), a Wide Area Network (WAN), a Metropolitan Area Network (MAN), a Public Switched Telephone Network (PSTN), a cloud communications network 26 and other types of wired and/or wireless communications networks 18.

The cloud communications network 18 may include one or more gateways, routers, bridges and/or switches As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Exemplary Information Display System

Figure 2:
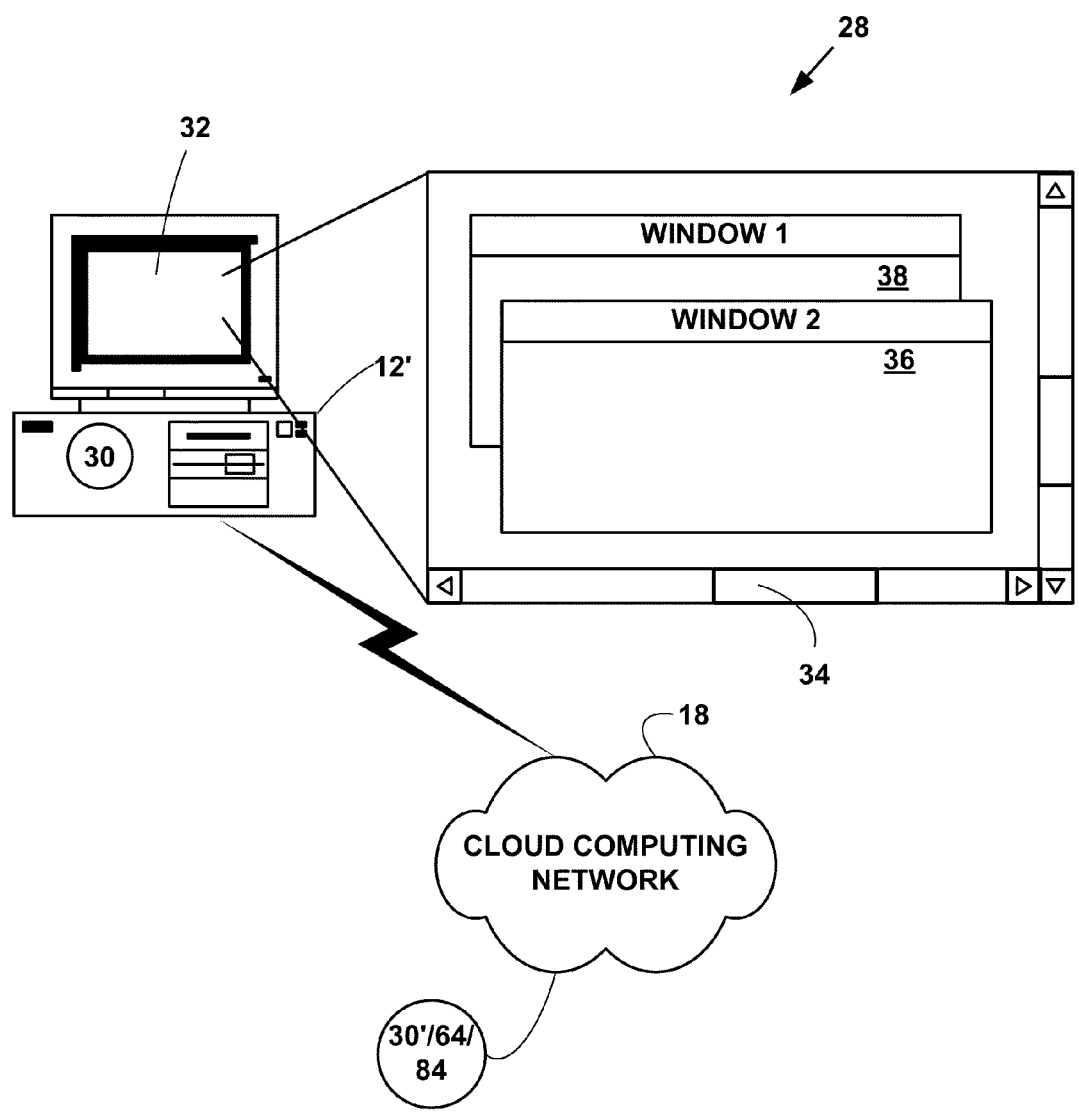
FIG. 2 is a block diagram illustrating an exemplary electronic information display system.

FIG. 2 is a block diagram illustrating an exemplary electronic information display system 28. The exemplary electronic information system display system includes, but is not limited to a target network device (e.g., computer 12', etc.) with an application 30 and a display component 32. The application 30 presents a graphical user interface (GUI) 34 on the display 32 component. The GUI 32 presents a multi-window 36, 38, interface to a user.

In one embodiment of the invention, the application 30 is a software application. However, the present invention is not limited to this embodiment and the application 30 can be hardware, firmware, hardware and/or any combination thereof. In one embodiment, the application 30 includes a cloud computing application 62 and/or a vertical search engine application 84. In another embodiment, the application 30/62/84 includes a smart phone application for a smart phone or a tablet computer. However, the present invention is not limited these embodiments and other embodiments can be used to practice the invention In another embodiment, a portion of the application 30 is executing on the target network devices 12, 14, 16 and another portion of the application 30/62/84 is executing on the server network devices 20, 22, 24, 26 However, the present invention is not limited these embodiments and other embodiments can be used to practice the invention.

Exemplary Networking Protocol Stack

Figure 3:
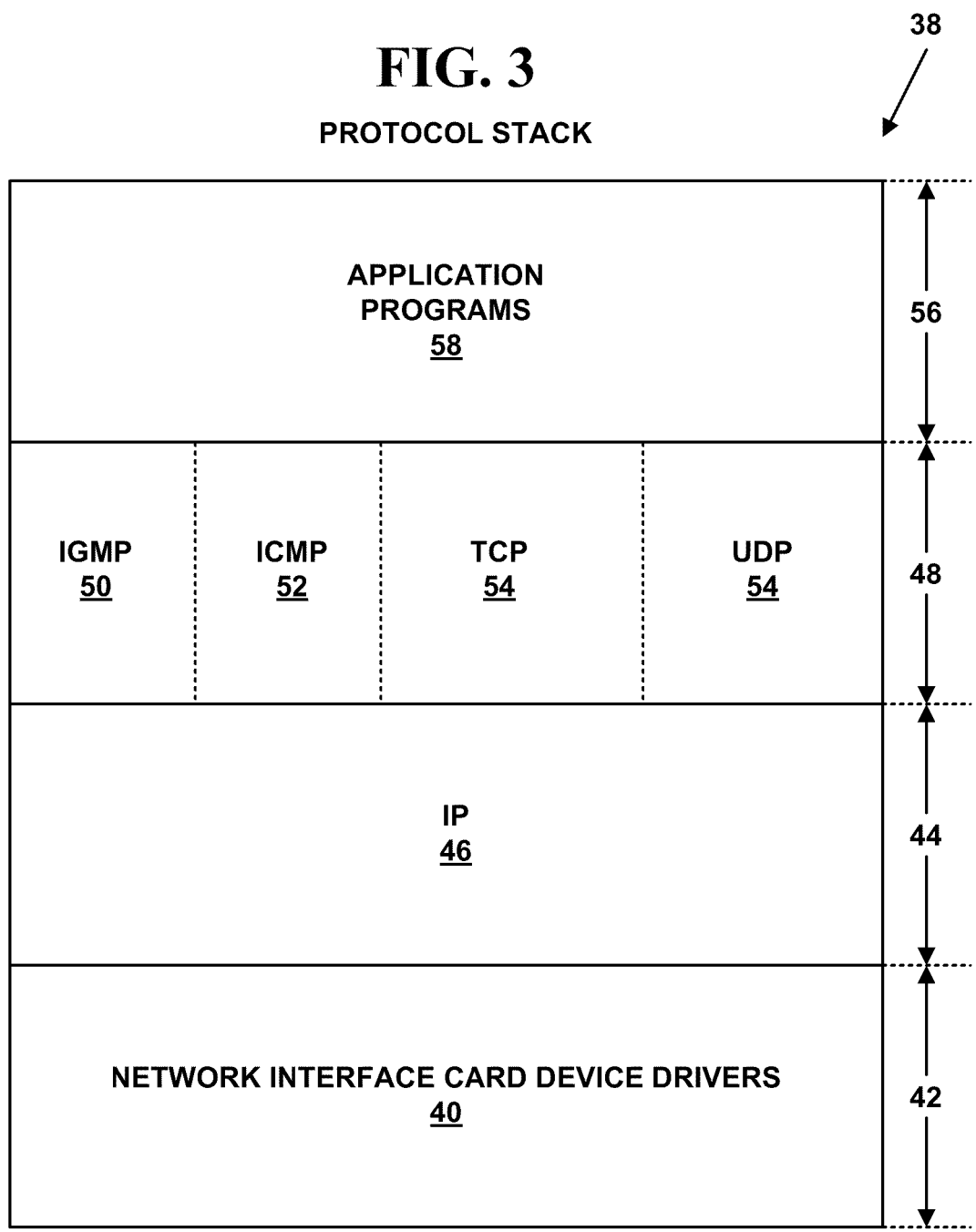
FIG. 3 is a block diagram illustrating an exemplary networking protocol stack.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 56 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer).

The network devices 12, 14, 16, 20, 22, 24, 26 are connected to the communication network 18 with Network Interface Card (NIC) device drivers 40 in a link layer 42 for the actual hardware connecting the network devices 12, 14, 16, 20, 22, 24, 26 to the cloud communications network 18. For example, the NIC device drivers 40 may include a serial port device driver, a modem device driver, an Ethernet device driver, a wireless device driver, a wired device driver, etc. The device drivers interface with the actual hardware being used to connect the network devices to the cloud communications network 18.

Above the link layer 42 is a network layer 44 (also called the Internet Layer for Internet Protocol suites). The network layer 44 includes, but is not limited to, an IP layer 46. As is known in the art, IP 46 is an addressing protocol designed to route traffic within a network or between networks. However, more fewer or other protocols can also be used in the network layer 44, and the present invention is not limited to IP 46.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 56 where application programs 58 (e.g., 30, 62, 84 etc.) to carry out desired functionality for a network device reside. For example, the application programs 54 for the client network devices 12, 14, 16 may include a web-browsers or other application programs, cloud application programs 62, while application programs for the server network devices 20, 22, 24, 26 may include other application programs (e.g., 30', 62, 84, etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for vertical searching. The NICs are connected to the plural server network devices 20, 22, 24, 26 and the cloud communications network 18. However, the present invention is not limited to the NICs described and other types of NICs in other configurations and connections with and/or without a buses can also be used to practice the invention.

In one embodiment, network devices 12, 14, 16, 20, 22, 24, 26 and wired and wireless interfaces including the NICs include "4G" components. As is known in the art "4G" refers to the fourth generation of wireless communications standards and speeds of 100 megabits/second to gigabits/second or more. It is a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs and multi-carrier transmission NICs. However, the present invention is not limited to this embodiment and 1G, 2G and 3G and/or any combination thereof, with or with 4G NICs can be used to practice the invention.

Cloud Computing Networks

In one embodiment, the cloud computing network includes a cloud communications network 18 comprising plural different networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

Figure 4:
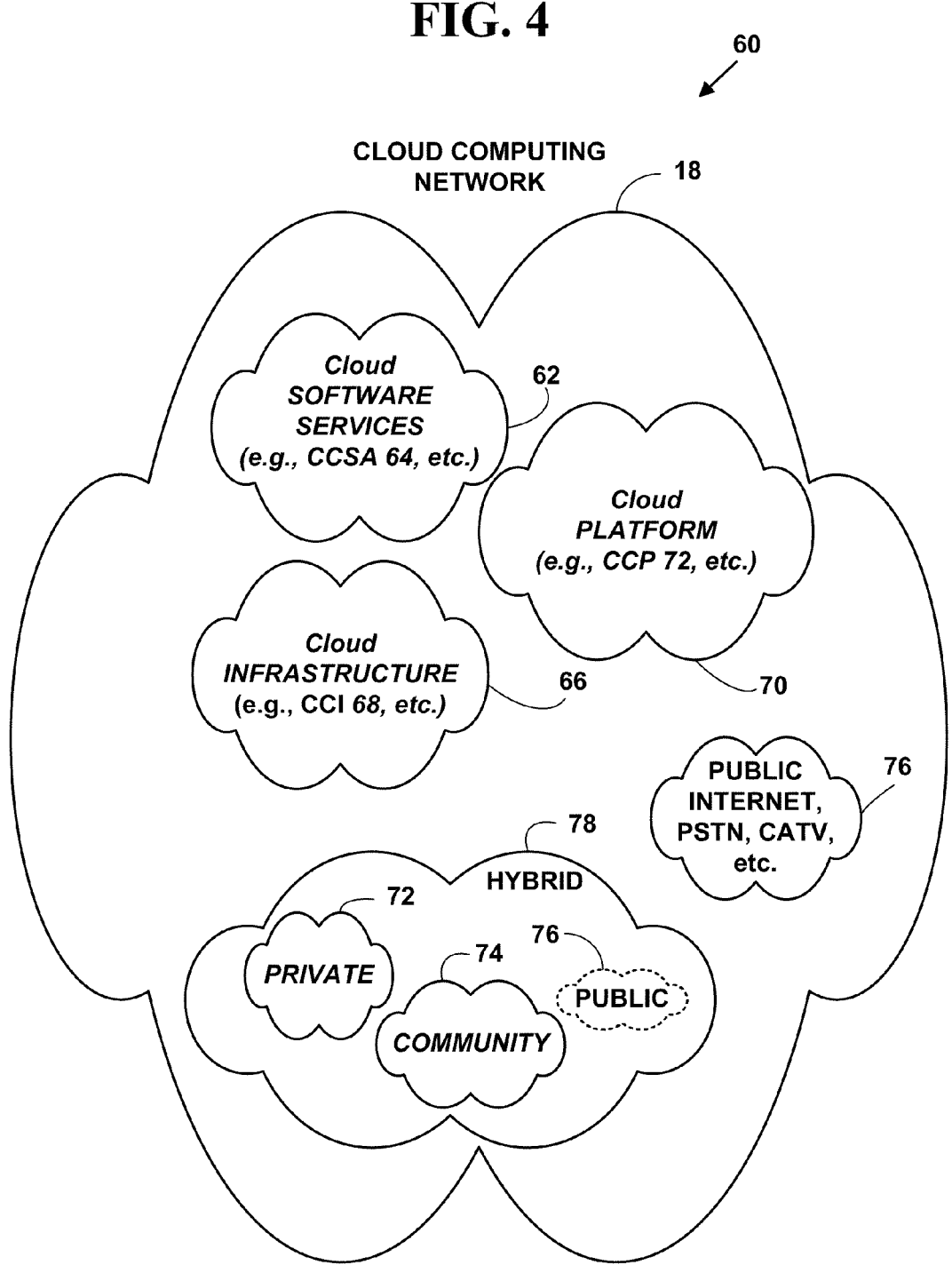
FIG. 4 is block diagram illustrating an exemplary cloud communications network.

FIG. 4 is a block diagram 60 illustrating an exemplary cloud communications network 18. However, the present invention is not limited to this cloud computing model and other cloud computing models can also be used to practice the invention. The exemplary cloud communications network includes both wired and/or wireless components of public and private networks.

This exemplary cloud computing model for vertical search engine promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand vertical search services. An vertical searcher can unilaterally provision computing capabilities, such as server time and network storage, as needed automatically without requiring human interaction with each network server on the cloud communications network 18.
Broadband network access. Vertical search engine capabilities are available over plural broadband communications networks and accessed through standard mechanisms that promote use by heterogeneous thin or thick client platforms (e.g., mobile phones, smart phones 14, tablet computers 12, laptops 12', PDAs, etc.). The broadband network access includes high speed network access such as 3G and/or 4G wireless and/or wired and broadband and/or ultra-broad band (e.g., WiMAX, etc.) network access.
Resource pooling. Vertical search engine computing resources are pooled to serve multiple vertical searchers using a multi-tenant model, with different physical and virtual resources dynamically assigned and reassigned according to vertical search demand. There is a sense of location independence in that the vertical searcher generally has no control or knowledge over the exact location of the provided vertical searching resources but may be able to specify location at a higher level of abstraction (e.g., country, state, or datacenter). Examples of pooled TABLE 1-continued resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale in for vertical search engine searching. To the vertical searcher, the vertical search capabilities available for provisioning appear to be unlimited and can be used in any quantity at any time.
Measured Services. Cloud computing systems automatically control and optimize resource use by leveraging a metering capability at some level of abstraction appropriate to the type of vertical search engine service (e.g., storage, processing, bandwidth, custom vertical search engines, etc.). Vertical search engine usage is monitored, controlled, and reported providing transparency for both the vertical search engine provider and the vertical searcher of the utilized vertical search engine service.

Exemplary cloud computing service models illustrated in FIG. 4 appear in Table 2. However, the present invention is not limited to these service models and more, fewer or other service models can also be used to practice the invention.

TABLE 1

Cloud Computing Software Applications 62 for a Vertical Search Engine Service (CCSA 64). The capability to use the provider's applications 30, 62 running on a cloud infrastructure 66. The cloud computing applications 62, are accessible from the server network device 26 from various client devices 12, 14, 16 through a thin client interface such as a web browser, etc. The user does not manage or control the underlying cloud infrastructure 66 including network, servers, operating systems, storage, or even individual application 30, 62 capabilities, with the possible exception of limited user-specific application configuration settings.
Cloud Computing Infrastructure 66 for the Vertical Search Engine Service (CCI 68). The capability provided to the user is to provision processing, storage, networks 18, 72, 74, 76, 78 and other fundamental computing resources where the consumer is able to deploy and run arbitrary software, which can include operating systems and applications 30, 62, 84. The user does not manage or control the underlying cloud infrastructure 66 but has control over operating systems, storage, deployed applications, and possibly limited control of select networking components (e.g., host firewalls, etc.).
Cloud Computing Platform 70 for the Vertical Search Engine Service (CCP 72). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30, 62, 84 and possibly application hosting environment configurations.

Exemplary cloud computing deployment models appear in Table 2. However, the present invention is not limited to these deployment models and more, fewer or other deployment models can also be used to practice the invention.

TABLE 2

Private cloud network 72. The cloud network infrastructure is operated solely for a vertical search engine organization. It may be managed by the vertical search engine organization or a third party and may exist on premise or off premise.
Community cloud network 74. The cloud network infrastructure is shared by several different organizations and supports a specific vertical community that has shared concerns (e.g., mission, security requirements, policy, compliance considerations, etc.). It may be managed by the different organizations or a third party and may exist on premise or off premise.
Public cloud network 76. The cloud network infrastructure such as the Internet, PSTN, CATV, etc. is made available to the general public or a large industry group and is owned by one or more organizations selling cloud services.
Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for vertical search engines takes full advantage of the cloud paradigm by being service oriented with a focus on statelessness, low coupling, modularity, and semantic interoperability for vertical searching.

Wireless Interfaces

In one embodiment of the present invention, the wireless interfaces on network devices 12, 14, 16, 20, 22, 24, 26 include but are not limited to, 3G and/or 4G IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the domain name "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) including HDTV that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Internet Television Services

In one embodiment, the applications 30, 62 provide television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

However, the present invention is not limited to such Internet Television services and more, fewer and/or other Internet Television services can be used to practice the invention.

General Search Engine Services

In one embodiment, the applications 30, 62 provide general search engine services. A search engine is designed to search for information on a cloud communications network 18 such as the Internet including World Wide Web servers, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the applications 30, 62 provide general search engine services as stand alone services. In another embodiment, the applications 30, 62 provide general search engine services by interacting with one or more other public search engines (e.g., GOOGLE, BING, YAHOO, etc.) and/or private search engine services.

However, the present invention is not limited to such general search engine services and more, fewer and/or other general search engine services can be used to practice the invention.

Vertical Search Engine Services

In one embodiment, the application 30, 62, 84 provide vertical search engines or "vortals" and/or vertical search engine services. As is known in the art, a vortal is a specific type of portal for a vertical search engine that provides information and resources related only to one (or a small number) specific topic. These sites typically contain focused information, such as "vertical" or "in-depth" information pertinent only to their particular targeted topic of interest. Vortals include information pertinent to a targeted topic of a very small horizontal breath, but a larger depth. Vortals are designed to include "the" source of pertinent information on the World-Wide-Web for a "community of interest."

Vortals typically provide news, research and statistics, discussions, newsletters, online tools, and many other services that educate users about a specific topic. Vortals typically use specialized searching algorithms to search and provide only information about a specific topic.

For example, a vortal may be created for people interested in the sport of football. On a general search engine, if a user typed in a search using the vague keyword "cheese boys" to search for Uniform Resource Locators (URLs) including hyperlinks to information about the National Football League (NFL) Green Bay Packers professional football team, the general search engine would return thousands of URLs including diary product names, animal names (e.g., cow names, nick-names, book names, video names, music group names, boy bands, boys clothing and/or a large amount of other information. The user would have to look through a large number of pages to find information on the Green Bay Packers football team.

In contrast, on a vortal specifically designed for football, entering a search using the vague keyword "cheese" would only return information about the Green Bay Packers. A user would have to sort through, very little if any, information not related to the Green Bay Packers Football team. Even very vague search terms on a vortal can be used to return highly relevant search results for a particular vortal.

In one embodiment, the applications 30, 62 provide vertical search engine services as stand alone services. In another embodiment, the applications 30, 62 provide vertical search engine services by interacting with one or more other public vertical search engines (e.g., GALAXY.com, etc.) and/or private vertical search engine services.

However, the present invention is not limited to such vertical search engine services and more, fewer and/or other vertical search engine services can be used to practice the invention.

Social Networking Services

In one embodiment, the applications 30, 62 provide one more social networking services to/from one or more social networking web-sites (e.g., FACEBOOK, U-TUBE, TWITTER, MY-SPACE, MATCH.COM, E-HARMONY, etc.). The social networking web-sites include, but are not limited to, dating web-sites, blogs, RSS feeds, and other types of information web-sites in which messages can be left or posted for a variety of social activities.

However, the present invention is not limited to the social networking services described and other public and private social networking services can also be used to practice the invention.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the Universal Resource Locator (domain name) "www.ieee.org." The ITU, (formerly known as the CCITT) standards can be found at the domain name "www.itu.ch." ETSI standards can be found at the domain name "www.etsi.org." IETF standards can be found at the domain name "www.ietf.org." The NIST standards can be found at the domain name "www.nist.gov." The ANSI standards can be found at the domain name "www.ansi.org." Bluetooth Forum documents can be found at the domain name "www.bluetooth.com." WAP Forum documents can be found at the domain name "www.wapforum.org." ADSL Forum documents can be found at the domain name "www.ads1.com."

Security And Encryption

Network devices and/or wired and wireless interfaces of the present invention include security and encryption for secure communications on the cloud communications network 18 and/or cloud communications network 26. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length<$2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods and more, fewer and/or other types of security and encryption methods can be used to practice the invention.

Vertical Search Engines with Cloud Computing Networks

A "vertical search engine", is distinct from a general web search engine (e.g., GOOGLE, BING, YAHOO, etc.) focuses on a specific vertical segment of online content. The vertical content area may be based on topicality, media type, or genre of content. Common vertical content includes sports information, shopping information, legal information, medical information, travel information, reference information, government information, etc.

In contrast to general search engines, which attempt to index large portions of the World Wide Web using a web crawler or web bot or web robot, vertical search engines typically use a focused vertical web crawler that attempts to index only web pages that are relevant to a pre-defined topic or set of topics.

Some vertical search sites focus on individual verticals, while other sites include multiple vertical searches within one vertical search engine (e.g., GALAXY.com, BIZNAR.com etc.).

Vertical search offers several potential benefits over general search engines as is illustrated in Table 3. However, the present invention is not limited to such benefits and more, fewer and/or other types of benefits can be used to practice the invention.

TABLE 3

Vertical Search Engine Benefits

Larger information depth, smaller information breath, thus providing a limited, focused information scope.
Greater information precision due to limited scope.
Leverage of domain knowledge including vertical taxonomies and vertical ontologies
A vertical "taxonomy," or vertical taxonomic scheme, is a particular classification ("the taxonomy of . . ."), arranged in a vertical hierarchical structure. Typically this is organized by super type and/or subtype vertical relationships, also called generalization-specialization relationships, or less formally, parent-child relationships. In such a vertical inheritance relationship, a subtype by definition has same properties, behaviors, and constraints as a super type plus one or more additional vertical properties, behaviors, or constraints.
A vertical "ontology" includes basic vertical categories and their relations. Ontology deals with questions concerning what entities exist or can be said to exist, and how such entities can be grouped, related within a vertical hierarchical structure, and subdivided according to similarities and differences of the vertical information.
Supports specific unique vertical-oriented user tasks including vertical search engine creation and vertical search customization and vertical search engine search tasks.

Figure 5:
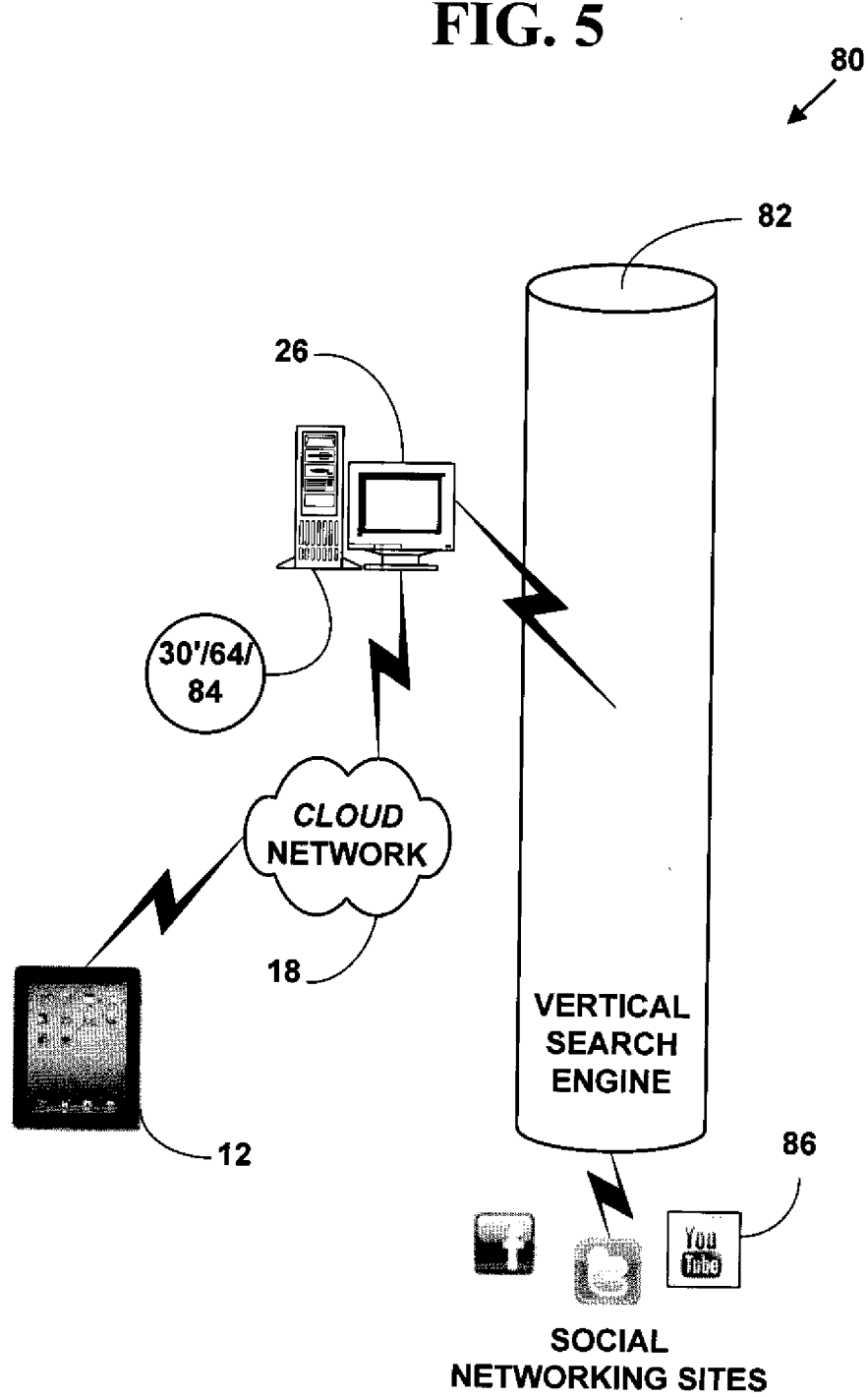
FIG. 5 is a block diagram illustrating an exemplary vertical search engine.

FIG. 5 is a block diagram 80 illustrating an exemplary vertical search engine 82.

The vertical search engine 82 includes a vertical search engine application 84 (as well as application 30 and/or cloud computing application 64, etc.) on a server network device (e.g., 26, etc.) in communications with a cloud communications network 18. The server network device 26 accepts vertical search engine requests from target network devices (e.g., 12, etc.) via the cloud communications network 18. The vertical search engine 82 may include plural social networking sites (e.g., FACEBOOK, TWITTER, UTUBE, etc.) and/or social networking information (e.g., FACEBOOK updates, TWEETS, etc.). A conventional, search engine 22 is illustrated in FIG. 1 that includes horizontal search information at wide breath for a large number of topics.

Figure 6:
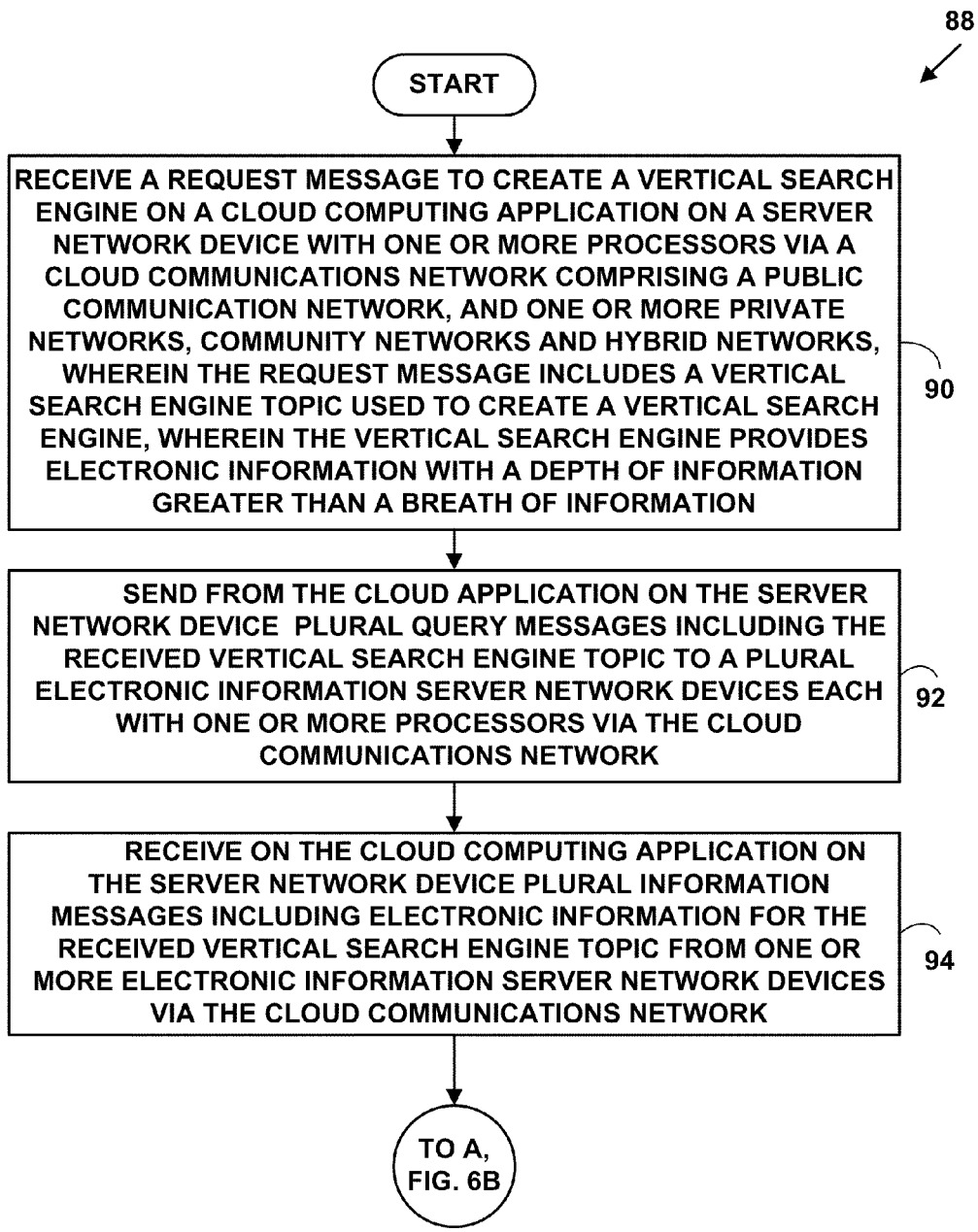
FIGS. 6A and 6B are a flow diagram illustrating a method for providing with cloud computing.

FIGS. 6A and 6B are a flow diagram illustrating a Method 88 for providing vertical search engines with cloud computing. In FIG. 6A at step 90, a request message to create a vertical search engine is received on a cloud computing application on a server network device with one or more processors via a cloud communications network comprising a public communication network, and one or more private networks, community networks and hybrid networks. The request message includes a vertical search engine topic used to create a vertical search engine. The vertical search engine provides electronic information with an information depth greater than an information breath. At Step 92, the cloud application on the server network device sends plural query messages including the received vertical search engine topic to plural electronic information server network devices each with one or more processors via the cloud communications network. At Step 94, the cloud computing application on the server network device receives plural information messages including electronic information for the received vertical search engine topic from one or more electronic information server network devices via the cloud communications network. In FIG. 6B at Step 96, a vertical search engine application is created on the cloud computing application on the server network device with the received electronic information. The vertical search engine application includes plural vertical taxonomies and plural vertical ontologies arranged in a vertical hierarchical structure. The received electronic information is located anywhere on the public communication network, the one or more private networks, community networks or hybrid networks on the cloud communications network. At Step 98, the vertical search engine application is made available to other network devices from server network device on the cloud communications network, thereby allowing plural other target network devices or other server network devices to selectively request one or more individual pieces of electronic information via the vertical search engine application on the server network device in real-time using less bandwidth and less processing cycles via the cloud communications network than via a non-cloud communications network.

Method 88 is illustrated with an exemplary embodiment. However, the invention is not limited to this embodiment and other embodiments can also be used to practice the invention.

In such an exemplary embodiment in FIG. 6A at step 90, a request message to create a vertical search engine is received on a cloud computing application 64 on a server network device 26 with one or more processors via a cloud communications network 18 comprising a public communication network 76, and one or more private networks 72, community networks 74 and hybrid networks 78. The request message includes a vertical search engine topic used to create a vertical search engine 82. The vertical search engine provides electronic information with an information depth greater than an information breath.

In one embodiment, the cloud communications network 18 provides on-demand self-service, broad network access, resource pooling, rapid elasticity and measured electronic services for vertical search engines.

In one embodiment, the server network device 26 includes a wireless networking interface comprising $4^{th}$ generation (4G) Worldwide Interoperability for Microwave Access (WiMax) wireless interface in communications with the cloud communications network 18.

In one embodiment, the cloud computing application 64 includes a cloud vertical search engine service CCS 64, a cloud computing platform CCP 68 for the vertical search engine service and a cloud computing infrastructure CCI 72 for the vertical search engine service.

In one embodiment, the cloud communications network 18 includes an on-demand vertical search engine service, broadband network access, resource pooling, rapid elasticity and measured network services for vertical search engine services.

At Step 92, the cloud computing application 64 on the server network device 26 sends plural query messages including the received vertical search engine topic to plural electronic information server network devices 20, 22, 24 each with one or more processors via the cloud communications network 18.

In one embodiment, the plural query messages are plural search engine query messages for public and/or private search engines. In another embodiment, the plural query messages are plural world wide web and/or other electronic information server requests.

However, the present invention is not limited to such query messages and more, fewer and/or other types of query messages can be used to practice the invention.

At Step 94, the cloud computing application 64 on the server network device 26 receives plural information messages including electronic information for the received vertical search engine topic from one or more electronic information server network devices 20, 22, 24 via the cloud communications network 18.

In FIG. 6B at Step 96, a vertical search engine application 84 is created on the cloud computing application 64 on the server network device 26 with the received electronic information. The vertical search engine application 26 includes plural vertical taxonomies and plural vertical ontologies arranged in a vertical hierarchical structure. The received electronic information is located anywhere on the public communication network 76, the one or more private networks 72, community networks 74 or hybrid networks 78 on the cloud communications network 18.

In one embodiment, the plural vertical taxonomies and the plural vertical ontologies include the taxonomies and/or ontologies described in Table 3.

However, the present invention is not limited to such taxonomies and/or ontologies and more, fewer and/or other types of taxonomies and/or ontologies can be used to practice the invention.

In one embodiment, the vertical hierarchical structure includes a visual vertical hierarchy structure. In such an embodiment, visual information (e.g., graphical icons, digital images, etc.) is used to group vertical search engine information.

In another embodiment, the vertical hierarchical structure includes vertical content-link clustering based on semantic information embedded in the electronic information (e.g., electronic documents, etc.) obtained from the cloud communications network 18. Plural vertical sub-hierarchies are used to abstract vertical search engine information into plural searchable vertical clusters that support quick and efficient vertical search engine query processing that is scalable across the various networks in the cloud communications network 18. The abstraction allows system resources on the server network device 26 to be used effectively with controlled information loss in a vertical search engine. Vertical search engine query processing operations on the plural vertical clusters provide the same performance results as performing the same operations on an entire non-vertical information space because of the vertical content-link clustering.

However, the present invention is not limited to these vertical hierarchies and more, fewer and/or other types of vertical hierarchical structures can be used to practice the invention In one embodiment, the vertical search engine application 84 includes a vertical search engine application 84 comprising a plurality of social networking sites 86.

In another embodiment, the vertical search engine application 84 includes a vertical search engine application 84 comprising social networking information.

However, the present invention is not limited to such embodiments and other vertical search engine applications with other vertical search engine information can be used to practice the invention.

At Step 98, the vertical search engine application 84 is made available to other network devices 12, 14, 15, 20, 22, 24 from server network device 26 on the cloud communications network 18, thereby allowing plural other target network devices 12, 14, 16 or other server network devices 20, 22, 24 to selectively request one or more individual pieces of electronic information via the vertical search engine application 84 on the server network device 28 in real-time using less bandwidth and less processing cycles via the cloud communications network 18 than via a non-cloud communications network.

Figure 7:
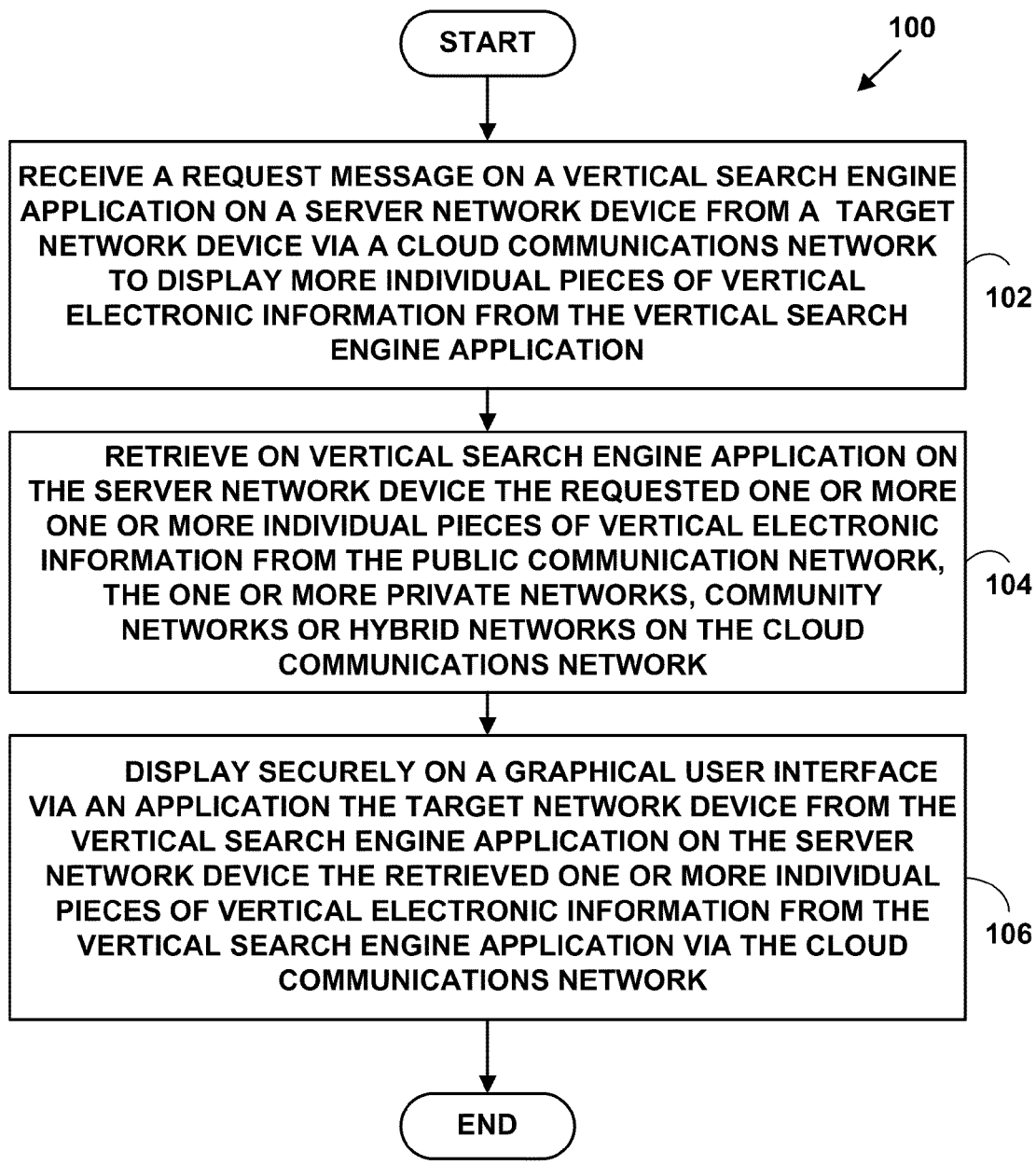
FIG. 7 is a flow diagram illustrating a method for providing vertical search engines with cloud computing.

FIG. 7 is a flow diagram illustrating a Method 100 for providing vertical search engines with cloud computing. At Step 102, a request message is received on a vertical search engine application on a server network device from a target network device via the cloud communications network to display more individual pieces of vertical electronic information from the vertical search engine application. At Step 104, vertical search engine application on the server network device retrieves the requested one or more one or more individual pieces of vertical electronic information from the public communication network, the one or more private networks, community networks or hybrid networks on the cloud communications network. At Step 106, an application on the target network device securely displays on a graphical user interface via from the vertical search engine application on the server network device the retrieved one or more individual pieces of vertical electronic information from the vertical search engine application via the cloud communications network.

Method 100 is illustrated with an exemplary embodiment. However, the invention is not limited to this embodiment and other embodiments can also be used to practice the invention.

In such an exemplary embodiment at Step 102, a request message is received on the vertical search engine application 84 on the server network device 26 from the target network device 12, 14, 16 via the cloud communications network 18 to display more individual pieces of vertical electronic information from the vertical search engine application 84.

At Step 104, the vertical search engine application 84 on the server network device 86 retrieves the requested one or more one or more individual pieces of vertical electronic information from the public communication network 76, the one or more private networks 72, community networks 74 or hybrid networks 78 on the cloud communications network 18.

At Step 106, an application 30 on the target network device 12, 14, 16 securely displays on a graphical user interface 32 via from the vertical search engine application 84 on the server network device 26 the retrieved one or more individual pieces of vertical electronic information from the vertical search engine application 84 via the cloud communications network 18.

Figure 8:
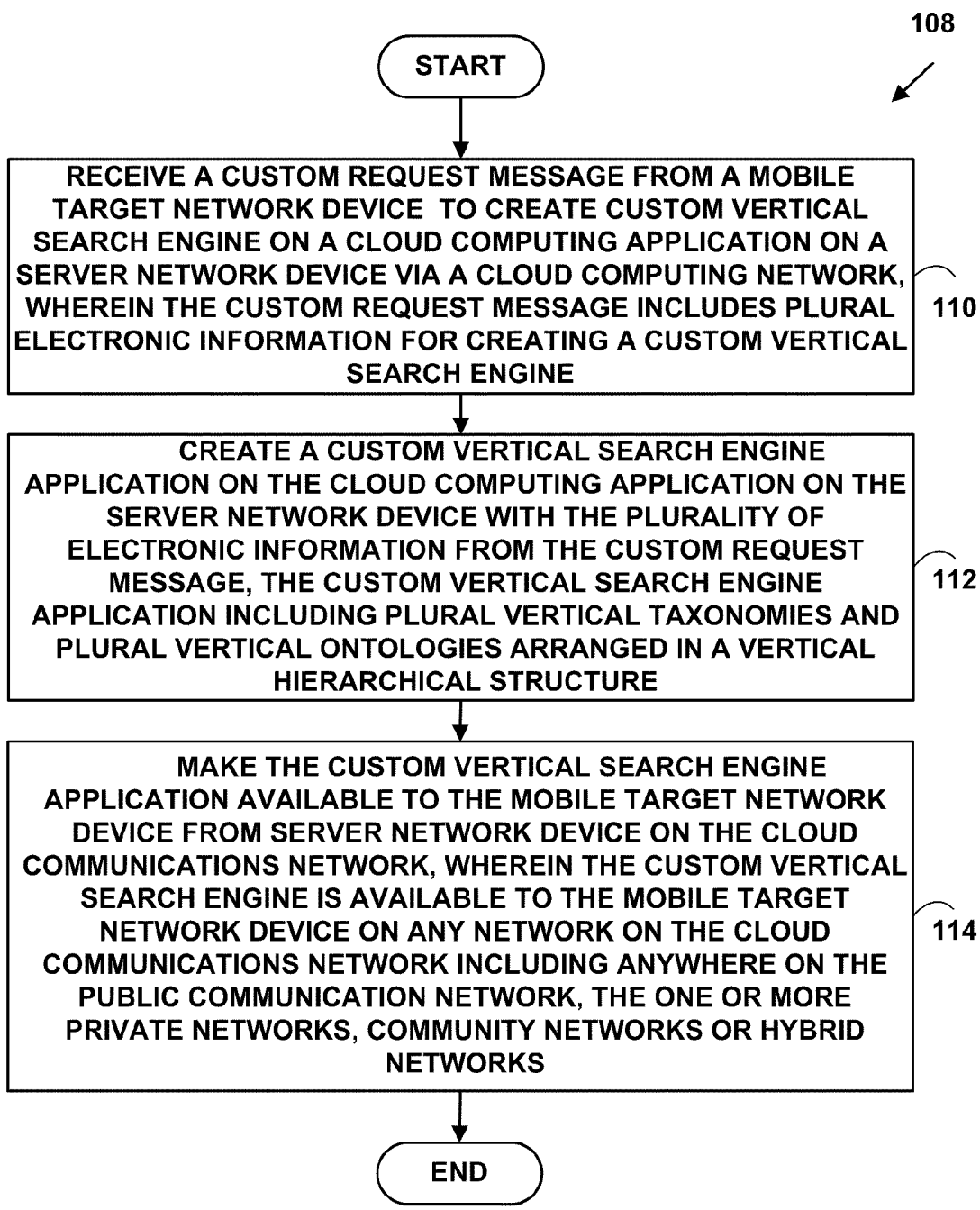
FIG. 8 is a flow diagram illustrating a method for providing vertical search engines with cloud computing.

FIG. 8 is a flow diagram illustrating a Method 108 for providing vertical search engines with cloud computing. At Step 110, a custom request message is received from a mobile target network device to create custom vertical search engine on the cloud computing application on the server network device via the cloud computing network. The custom request message includes plural electronic information for creating a custom vertical search engine. The plural electronic information includes plural vertical search custom keywords and/or vertical search custom topics. At Step 112, a custom vertical search engine application is created on the cloud computing application on the server network device with the plural electronic information from the custom request message, the custom vertical search engine application including plural vertical taxonomies and plural vertical ontologies arranged in a vertical hierarchical structure. At Step 114, making the custom vertical search engine application is made available to the mobile target network device from server network device on the cloud communications network, wherein the custom vertical search engine is available to the mobile target network device on any network on the cloud communications network including anywhere on the public communication network, the one or more private networks, community networks or hybrid networks depending on a physical location for the mobile target network device.

Method 108 is illustrated with an exemplary embodiment. However, the invention is not limited to this embodiment and other embodiments can also be used to practice the invention.

In such an exemplary embodiment at Step 110, a custom request message is received from a mobile target network device 12, 14, 16 to create a custom vertical search engine on the cloud computing application 64 on the server network device 26 via the cloud communications network 18. The custom request message includes plural electronic information for creating a custom vertical search engine as defined by a user of the mobile target network device 12, 14, 16. The plural electronic information includes plural custom vertical search engine topics and/or custom vertical search engine keywords.

For example, the custom vertical keywords may include "cheese," "cheeze," "cheese boys," etc. to return information about the Green Bay Packers, "dude," "hang ten," "hang loose," "narly," etc. to return information about surfing, etc.

In one embodiment the custom request message includes plural barcodes. A "barcode" is an optical machine-readable representation of data, which shows data about the object to which it attaches. Originally, barcodes represented data by varying the widths and spacings of parallel lines, and may be referred to as linear or 1 dimensional (1D). Later they evolved into rectangles, dots, hexagons and other geometric patterns in 2 dimensions (2D). Although 2D systems use a variety of symbols, they are generally referred to as barcodes as well. Barcodes originally were scanned by special-optical scanners called barcode readers, scanners and interpretive software are available on devices including desktop printers and smart phones 14 and tablet computers 12.

Table 4 illustrates exemplary linear barcodes, the standards of all of which are incorporated by reference. However, the present invention is not limited to the exemplary linear barcodes listed in Table 4, and more fewer and other linear barcodes can also be used to practice the invention.

TABLE 4

| Linear Bar Codes |
| --- |
| U.P.C. |
| Codabar |
| Code 25 - Non-interleaved 2 of 5 |
| Code 25 - Interleaved 2 of 5 |
| Code 39 |
| Code 93 |
| Code 128 |
| Code 128A |
| Code 128B |
| Code 128C |
| Code 11 |
| CPC Binary |
| DUN 14 |

TABLE 4-continued

Linear Bar Codes

EAN 2
EAN 5
EAN 8, EAN 13
Facing Identification Mark
GS1-128 (formerly known as UCC/EAN-128), incorrectly referenced as EAN 128 and UCC 128
GS1 DataBar, formerly Reduced Space Symbology (RSS)
HIBC (HIBCC Health Industry Bar Code)
ITF-14
Latent image barcode
Pharmacode
Plessey
PLANET
POSTNET
Intelligent Mail barcode
MSI
PostBar
RM4SCC/KIX
JAN
Telepen Table 5 illustrates exemplary matrix (2D) barcodes, the standards of all of which are incorporated by reference. However, the present invention is not limited to the exemplary matrix barcodes listed in Table 5, and more fewer and other matrix barcodes can also be used to practice the invention.

TABLE 15

Matrix Bar Codes

3-DI
ArrayTag
Aztec Code
Small Aztec Code
Chromatic Alphabet
Codablock
Code 1
Code 16K
Code 49
ColorCode
Compact Matrix Code
CP Code
CyberCode
d-touch
DataGlyphs
Datamatrix
Datastrip Code
Dot Code A
EZcode
Grid Matrix Code
High Capacity Color Barcode
HueCode
INTACTA.CODE
InterCode
JAGTAG
Lorem ipsum
MaxiCode
mCode
MiniCode
MicroPDF417
MMCC
Nintendo e-Reader#Dot code
Optar
PaperDisk
PDF417
PDMark
QR Code
QuickMark Code
SmartCode
Snowflake Code
ShotCode
SPARQCode
SuperCod
Trillcode TABLE 15-continued Matrix Bar Codes UltraCode
UnisCode
VeriCode, VSCode
WaterCode In one specific embodiment, the application 30, 62 interacts with a bar code reader application. However, the present invention is not limited to a bar code reader application and other applications can also be used to practice the invention.

Figure 9:
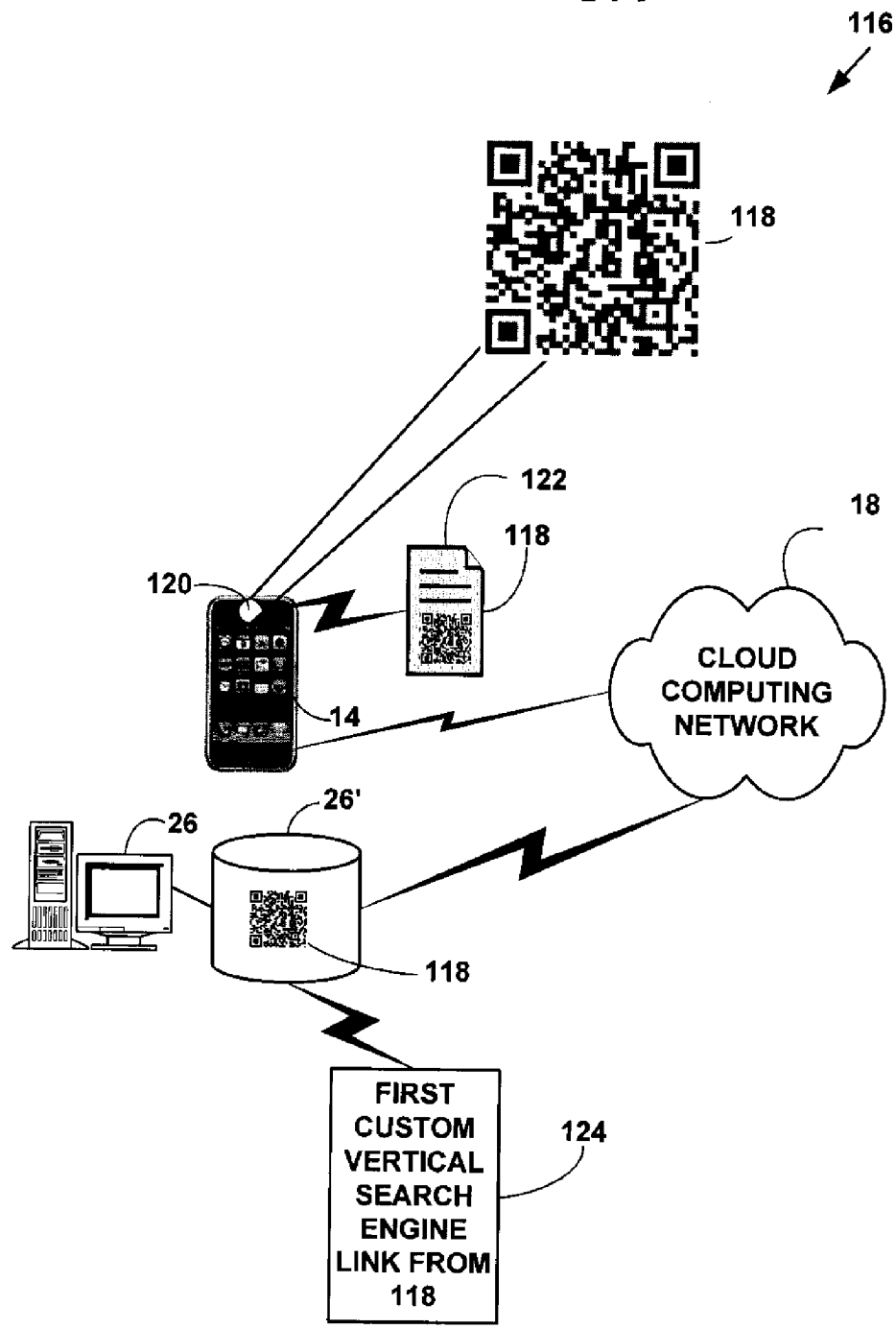
FIG. 9 is a block diagram illustrating a display of an exemplary QR bar code.

In one specific exemplary embodiment, a QR bar code is used. However, the present invention is not limited to QR codes and other types of bar codes can also be used to practice the invention FIG. 9 is a block diagram 116 illustrating display of an exemplary QR bar code 118.

Encoded in the QR bar code 118 is the text "This a QR generated by Zachary C. Lesavich." When a QR bar code reader is used to read the QR bar code 118, this text will be returned.

A "QR Code" is a specific matrix barcode (or two-dimensional code), readable by dedicated QR barcode readers and camera phones. The code consists of black modules arranged in a square pattern on a white background. The information encoded can be text, URL or other data. QR codes are defined in *ISO/IEC* 18004:2006 *Information technology—Automatic identification and data capture techniques—QR Code* 2005 *bar code symbology specification,* 1-Sep.-2006, the contents of which are incorporated by reference.

Users with a camera equipped smart phone 14 (or tablet computer 12, etc.) with a the camera component 120, a bar code reader application appropriate for the bar code processes the digital image of the QR Code 118 can include the QR Code 118 in the custom request message sent at Step 112. The camera component 120 is used to capture existing QR codes from print and electronic advertising 122 and other sources (e.g., from other network devices, etc.) The vertical search engine application 84 converts the QR code 118 into appropriate electronic links 124 in a custom vertical search engine created by the user.

QR codes are also used to display text, contact information, connect to a wireless network, open a web page in the phone's browser or initiate a communications event over the cloud communications network 18 (e.g., voice call, data call, etc.) This act of linking from physical world objects is known as a "hardlink" or "physical world hyperlinks."

For example, Google's smart phone Android operating system supports the use of QR codes by natively including the barcode scanner (e.g., Zxing, etc.) on some models, and the browser supports Uniform Resource Identifier (URI) redirection, which allows QR Codes to send metadata to existing applications on the device. Nokia's Symbian operating system is also provided with a barcode scanner, which is able to read QR codes, while mbarcode is a QR code reader for the Maemo operating system. In the Apple iOS, a QR code reader is not natively included, but hundreds of free applications available with reader and metadata browser URI redirection capability. However, the present invention is not limited to these network device operating systems and other bar code readers and device operating systems can also be used to practice the invention.

In one embodiment, a user may scan a number of QR bar codes from non-electronic information such as magazines, business cards, billboards, other non-electronic advertising, etc. A user may also scan a number of QR bar codes from electronic advertising such from web-sites, other target network devices 12, 14, 16, from e-mails, text messages, instant messages, etc. The plural QR bar codes from any source are sent in the custom request message at Step 110.

For example, a user may be interested in the sport of surfing. The user may collect plural QR bar codes from surfing magazines and/or plural QR bar codes from web-sites related to surfing events and/or surfing related products. The user may also generate his/her own custom QR bar codes (e.g., to a user's own web-site, favorite surfing web-site, a web-site with tide and/or weight heights, a weather web-site, etc.) The plural QR bar codes are then used to create a custom (and customizable) vertical search engine for the user. However, the present invention is not limited to this example and other types of custom vertical search engines can also be used to practice the invention.

Returning to FIG. 8 at Step 112, a custom vertical search engine application 84' is created on the cloud computing application 84 on the server network device 26 with the plural electronic information from the custom request message, the custom vertical search engine application including plural vertical taxonomies and plural vertical ontologies arranged in a vertical hierarchical structure as was described above.

At Step 114, making the custom vertical search engine application 84' is made available to the mobile target network device 12, 14, 16 from server network device 26 on the cloud communications network 18. The custom vertical search engine application 84' is available to the mobile target network device 12, 14, 16 on any network on the cloud communications network 18 including anywhere on the public communication 76 network, the one or more private networks 72, community networks 74 or hybrid networks 78 depending on a physical location for the mobile target network device 12, 14, 16.

For example, if the mobile target network device 12, 14, 16 is physically closest to a community network 74 on the cloud computing network 18, the custom vertical search engine application 84' is made available to the mobile target network device 12, 14, 16 from server network device 26 via the community network 74. If the mobile target network device 12, 14, 16 moves to a new location nearer to a private network 72, the custom vertical search engine application 84' is made available to the mobile target network device 12, 14, 16 from server network device 26 via the private network 74, etc.

Figure 10:
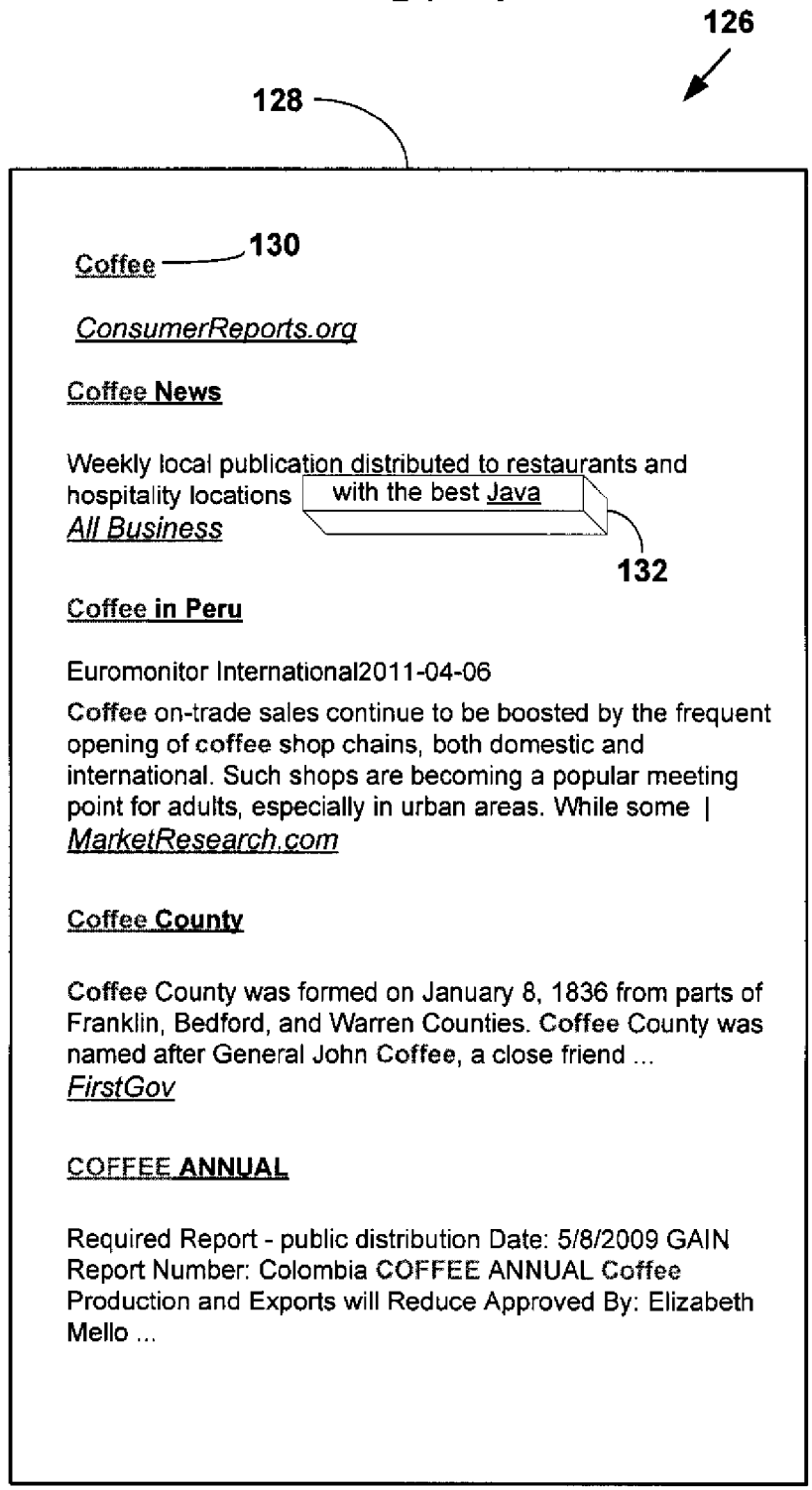
FIG. 10 is a block diagram illustrating a display of an exemplary vertical search engine display output.

FIG. 10 is a block diagram 126 illustrating a display of an exemplary vertical search engine display output for coffee 128 displayable a display component 32 of the target network device 12, 14, 16. The display 128 includes 2D 130 and/or 3D components 132 and/or a combination of 2D and 3D display components.

FIG. 10 illustrates a portion of the vertical hierarchical structure including vertical content-link clustering based on semantic information (e.g., the key words "coffee," "java," etc.) embedded in the electronic information (e.g., electronic documents, etc.) obtained from the cloud communications network 18.

As another example, a user may create a vertical search engine including his/her favorite coffee shops by scanning a QR code 118 from a cup of coffee at plural different coffee shops and use Method 108 to create a custom vertical search engine with output similar to that illustrated in FIG. 10.

However, the present invention is not limited to such embodiments and examples and embodiments, examples with other vertical hierarchical structures with other vertical search engine information can be used to practice the invention.

In one embodiment, vertical search engine information display 128 displayed in a graphical window 36, 38 in the GUI 34 on a smart phone 14 or table computer 12 or other target network device 16 or sever network device 20, 22, 24, 26 includes graphical windows with 2D 130 and 3D 132 graphical objects displayed and/or a combination of 2D and 3D graphical objects displayed. When the 3D graphical objects 132 are displayed on the GUI 34, they provide a more distinct graphical object that is more easily viewable and one that "pops" off the GUI 32 when viewed by a trader. The 3D objects 132 allow a vertical searcher to more easily follow the object visually as the in vertical a search window. In one embodiment, 3D glasses are not required or used to view the 3D graphical objects. In such an embodiment, the 3D graphical objects 132 are displayed in a specialized 3D format using a first type of 3D API.

In another embodiment, 3D glasses are used to view the 3D graphical objects 132. In such an embodiment, the 3D graphical objects 132 are displayed in a specialized 3D format using another type of 3D API. However, 3D glasses are not required to view the 3D graphical objects and the invention can be practiced without 3D glasses, the specialized 3D format or the 3D API.

For example in one embodiment with 3D glasses required, 3D stereoscopy is used. 3D stereoscopy (also called stereoscopic or 3-D imaging) is a technique capable of recording three-dimensional visual information and/or creating the illusion of depth in an image for 3D display. However, the present invention is not limited to such embodiments an 3D objects can be used without specialized 3D glasses, etc.

The methods and systems described herein create vertical search engines via cloud computing with a cloud communications network using public networks, private networks, community networks and hybrid networks. The cloud communications network provides on-demand self-service, broad network access, resource pooling, rapid elasticity and measured electronic services for vertical search engines. The method and system dramatically improve a vertical search engine infrastructure used by searchers by providing vertical electronic information using less bandwidth and less processing cycles via the cloud communications network than via a non-cloud communications network. Custom vertical search engines can be created by a user with QR bar codes and other types of bar codes and other types of custom information.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for creating a vertical search engine with a cloud communications network, comprising:
   a user scanning one or more barcodes;
   receiving a request message to create a vertical search engine on a cloud computing application on a server network device with one or more processors from an application on a target network device with one or more processors via a cloud communications network comprising one or more public communication networks, one or more private networks, one or more community networks and one or more hybrid networks, the cloud communications network including a cloud vertical search engine service, a cloud computing platform for the cloud vertical search engine service a cloud computing infrastructure for the cloud vertical search engine service, on-demand vertical search engine services, broadband network access, resource pooling, rapid elasticity and measured network services for vertical search engine services,
   wherein the request message includes one or more bar codes scanned into the application on the target network device, the one or more bar codes including a vertical search engine topic used to create a vertical search engine wherein the vertical search engine provides electronic information with a depth of information for the vertical search engine topic greater than a breath of information for the vertical search engine topic;
   sending from the cloud application on the server network device a plurality of query messages including the received vertical search engine topic to a plurality of electronic information server network devices each with one or more processors via the cloud communications network;
   receiving on the cloud computing application on the server network device a plurality of information messages including electronic information for the received vertical search engine topic from one or more electronic information server network devices via the cloud communications network;
   creating a vertical search engine application on the cloud computing application on the server network device with the received electronic information, the vertical search engine application including a plurality of vertical taxonomies and a plurality of vertical ontologies arranged in a vertical hierarchical structure, wherein the received electronic information is located anywhere on the public communication network, the one or more private networks, community networks and hybrid networks on the cloud communications network; and
   making the vertical search engine application available to the target network device and a plurality of other network devices from server network device on the cloud communications network,
   thereby allowing the target network device, a plurality of other target network devices and a plurality of other server network devices to selectively request one or more individual pieces of electronic information via the vertical search engine application on the cloud computing application on the server network device in real-time using less bandwidth and less processing cycles via the cloud communications network than via a non-cloud communications network.

2. The method of claim 1, further comprising:
   receiving a request message on the vertical search engine application on the server network device from the target network device via the cloud communications network to display more individual pieces of vertical electronic information from the vertical search engine application;
   retrieving on the vertical search engine application on the server network device the requested one or more one or more individual pieces of vertical electronic information from the public communication network, the one or more private networks, community networks or hybrid networks on the cloud communications network; and
   displaying securely on a graphical user interface via an application the target network device from the vertical search engine application on the server network device the retrieved one or more individual pieces of vertical electronic information from the vertical search engine application via the cloud communications network.

3. The method of claim 1 wherein the step of displaying securely includes displaying securely using a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), Hyper-Text Transport Protocol Secure, (HTTPs), Secure Sockets Layer (SSL), or a Transport Layer Security (TLS) security method.

4. The method of claim 1, further comprising:
   making the vertical search engine application available to other server network devices from the server network device on the cloud communications network; and
   allowing the other server network devices to selectively request and display one or more individual pieces of electronic information via the vertical search engine application from the server network device in real-time using less bandwidth and less processing cycles from any network on the cloud communications network including anywhere on the one or more public communication networks, private networks, community networks or hybrid networks.

5. The method of claim 1 wherein the server network device and the target network device includes a wireless networking interface comprising a Worldwide Interoperability for Microwave Access (WiMax) wireless networking interface with $4^{th}$ generation (4G) wireless speeds for communicating with the cloud communications network.

6. The method of claim 1 wherein target network device includes a smart phone or a tablet computer.

7. The method of claim 1 wherein the one or more bar codes include one or more QR bar codes.

8. The method of claim 1 wherein the vertical search engine application includes a vertical search engine application comprising a plurality of social networking sites.

9. The method of claim 1 wherein the vertical search engine application includes a vertical search engine application comprising social networking information.

10. The method of claim 1 wherein the plurality of vertical taxonomies include super type and subtype relationships of vertical electronic information with inheritance.

11. The method of claim 1 wherein the plurality of vertical ontologies include pre-determined categories of vertical electronic information and their relations subdivided according to similarities and differences of vertical electronic information.

12. The method of claim 1 wherein the vertical hierarchical structure includes a visual vertical hierarchical structure.

13. The method of claim 1 wherein the vertical hierarchical structure includes a vertical hierarchical structure comprising vertical content link clustering based on semantic information embedded in the one or more one or more individual pieces of vertical electronic information obtained from the cloud communications network.

14. The method of claim 1 further comprising:
receiving a custom request message from a mobile target network device to create custom vertical search engine on the cloud computing application on the server network device via the cloud computing network, wherein the custom request message includes a plurality of electronic information for creating a custom vertical search engine including a plurality of custom vertical search topics and a plurality of custom vertical search engine keywords;
creating a custom vertical search engine application on the cloud computing application on the server network device with the plurality of electronic information from the custom request message, the custom vertical search engine application including a plurality of vertical taxonomies and a plurality of vertical ontologies arranged in a vertical hierarchical structure; and
making the custom vertical search engine application available to the mobile target network device from server network device on the cloud communications network, wherein the custom vertical search engine is available to the mobile target network device on any network on the cloud communications network including anywhere on the public communication network, the one or more private networks, community networks or hybrid networks depending on a physical location for the mobile target network device.

15. The method of claim 14 wherein the custom request message includes a plurality of bar codes scanned into the mobile target network device.

16. The method of claim 15 wherein the plurality of bar codes include a plurality of bar codes obtained with a camera component on the mobile target network device from electronic advertising and non-electronic advertising.

17. The method of claim 15 wherein the plurality of bar codes include a plurality of QR bar codes.

18. The method of claim 17 wherein the plurality of bar codes include a plurality of custom QR bar codes created by a user with a QR bar code creation application.

19. A non-transitory computer readable medium having stored therein a plurality of instructions for causing one or more processors to execute the steps of:
a user scanning one or more barcodes;
receiving a request message to create a vertical search engine on a cloud computing application on a server network device with one or more processors from an application on a target network device with one or more processors via a cloud communications network comprising one or more public communication networks, one or more private networks, one or more community networks and one or more hybrid networks, the cloud communications network including a cloud vertical search engine service, a cloud computing platform for the cloud vertical search engine service a cloud computing infrastructure for the cloud vertical search engine service, on-demand vertical search engine services, broadband network access, resource pooling, rapid elasticity and measured network services for vertical search engine services,
wherein the request message includes one or more bar codes scanned into the application on the target network device, the one or more bar codes including a vertical search engine topic used to create a vertical search engine wherein the vertical search engine provides electronic information with a depth of information for the vertical search engine topic greater than a breath of information for the vertical search engine topic;
sending from the cloud application on the server network device a plurality of query messages including the received vertical search engine topic to a plurality of electronic information server network devices each with one or more processors via the cloud communications network;
receiving on the cloud computing application on the server network device a plurality of information messages including electronic information for the received vertical search engine topic from one or more electronic information server network devices via the cloud communications network;
creating a vertical search engine application on the cloud computing application on the server network device with the received electronic information, the vertical search engine application including a plurality of vertical taxonomies and a plurality of vertical ontologies arranged in a vertical hierarchical structure, wherein the received electronic information is located anywhere on the public communication network, the one or more private networks, community networks and hybrid networks on the cloud communications network; and
making the vertical search engine application available to the target network device and a plurality of other network devices from server network device on the cloud communications network,
thereby allowing the target network device, a plurality of other target network devices and a plurality of other server network devices to selectively request one or more individual pieces of electronic information via the vertical search engine application on the cloud computing application on the server network device in real-time using less bandwidth and less processing cycles via the cloud communications network than via a non-cloud communications network.

20. A system for creating a vertical search engine with a cloud communications network, comprising in combination:
means for a user scanning one or more barcodes;
means for receiving a request message to create a vertical search engine on a cloud computing application on a server network device with one or more processors from an application on a target network device with one or more processors via a cloud communications network comprising one or more public communication networks, one or more private networks, one or more community networks and one or more hybrid networks, the cloud communications network including a cloud vertical search engine service, a cloud computing platform for the cloud vertical search engine service a cloud computing infrastructure for the cloud vertical search engine service, on-demand vertical search engine services, broadband network access, resource pooling, rapid elasticity and measured network services for vertical search engine services,
wherein the request message includes one or more bar codes scanned into the application on the target network device, the one or more bar codes including a vertical search engine topic used to create a vertical search engine wherein the vertical search engine provides electronic information with a depth of information for the vertical search engine topic greater than a breath of information for the vertical search engine topic;

means for sending from the cloud application on the server network device a plurality of query messages including the received vertical search engine topic to a plurality of electronic information server network devices each with one or more processors via the cloud communications network;

means for receiving on the cloud computing application on the server network device a plurality of information messages including electronic information for the received vertical search engine topic from one or more electronic information server network devices via the cloud communications network;

means for creating a vertical search engine application on the cloud computing application on the server network device with the received electronic information, the vertical search engine application including a plurality of vertical taxonomies and a plurality of vertical ontologies arranged in a vertical hierarchical structure, wherein the received electronic information is located anywhere on the public communication network, the one or more private networks, community networks and hybrid networks on the cloud communications network;

means for making the vertical search engine application available to the target network device and a plurality of other network devices from server network device on the cloud communications network, thereby allowing the target network device, a plurality of other target network devices and a plurality of other server network devices to selectively request one or more individual pieces of electronic information via the vertical search engine application on the cloud computing application on the server network device in real-time using less bandwidth and less processing cycles via the cloud communications network than via a non-cloud communications network;

means for receiving a second request message on the vertical search engine application on the server network device from the target network device via the cloud communications network to display more individual pieces of vertical electronic information from the vertical search engine application;

means for retrieving on vertical search engine application on the server network device the requested one or more one or more individual pieces of vertical electronic information from the public communication network, the one or more private networks, one or more community networks and one or more hybrid networks on the cloud communications network;

means for displaying securely on a graphical user interface via an application the target network device from the vertical search engine application on the server network device the retrieved one or more individual pieces of vertical electronic information from the vertical search engine application via the cloud communications network;

means for receiving a custom request message from a mobile target network device to create a custom vertical search engine on the cloud computing application on the server network device via the cloud computing network, wherein the custom request message includes a plurality of electronic information for creating a custom vertical search engine;

means for creating a custom vertical search engine application on the cloud computing application on the server network device with the plurality of electronic information from the custom request message, the custom vertical search engine application including a plurality of custom vertical taxonomies and a plurality of custom vertical ontologies arranged in a custom vertical hierarchical structure; and means for making the custom vertical search engine application available to the mobile target network device from server network device on the cloud communications network, wherein the custom vertical search engine is available to the mobile target network device on any network on the cloud communications network including anywhere on the public communication network, the one or more private networks, one or more community networks and one or more hybrid networks depending on a physical location for the mobile target network device.

* * * * *